US008265649B1

(12) United States Patent
Moll et al.

(10) Patent No.: US 8,265,649 B1
(45) Date of Patent: Sep. 11, 2012

(54) METHOD AND SYSTEM FOR LOCATION DETERMINATION IN A COMPOSITE WIRELESS/LANDLINE COMMUNICATION SYSTEM

(75) Inventors: Keith E. Moll, Overland Park, KS (US); Khaled F. Al-Khashti, Overland Park, KS (US); Brent A. Burpee, Olathe, KS (US); David L. Morris, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2288 days.

(21) Appl. No.: 10/645,298

(22) Filed: Aug. 21, 2003

(51) Int. Cl.
*H04W 24/00* (2009.01)
(52) U.S. Cl. .................................... 455/456.1
(58) Field of Classification Search ............... 455/456.1, 455/456.2, 456.4, 456.3, 456.5, 445, 412.1, 455/404.2; 379/45, 49
See application file for complete search history.

(56) References Cited

U.S. PATENT DOCUMENTS

| 6,529,722 | B1 * | 3/2003 | Heinrich et al. | 455/404.1 |
| 2004/0184584 | A1 * | 9/2004 | McCalmont et al. | 379/45 |
| 2005/0100153 | A1 * | 5/2005 | Pines et al. | 379/218.01 |

OTHER PUBLICATIONS

TR-45, Enhanced Wireless 9-1-1 Phase 2, TIA/EIA/J-STD036-A, Mar. 2002.
Joint Standard, Enhanced wireless 9-1-1 Phase 2 Addendum 1, J-STD-036-A-1, Mar. 2003.

* cited by examiner

*Primary Examiner* — Rafael Pérez-Gutiérrez (57) ABSTRACT

A method and system for determining reporting the location of an originating telephone device. A location interoperability platform receives a signaling message from a switch, reflecting a call request from an originating device and carrying data indicating whether the originating device is a landline device or a wireless device. If the data indicates that the originating device is a landline device, then the location interoperability platform invokes a landline location-determination process to determine the location of the originating device. On the other hand, if the data indicates that the originating device is a wireless device, then the location interoperability platform invokes a wireless location-determination process to determine the location of the originating device. The location interoperability platform may then report the determined location to the called party, to help facilitate a location-based service such as emergency response.

25 Claims, 4 Drawing Sheets

METHOD AND SYSTEM FOR LOCATION DETERMINATION IN A COMPOSITE WIRELESS/LANDLINE COMMUNICATION SYSTEM

BACKGROUND

1. Field of the Invention

The present invention relates to telecommunications systems and more particularly to determining the location of a telephone in order to facilitate 911 service or other location-based services.

2. Description of Related Art

For many years, the public switched telephone network and 911 emergency service centers have been equipped to determine the location of emergency callers, in order to facilitate emergency response.

Until recently, such calls originated mainly from landline telephones. Therefore, the process of determining the location of a caller was a usually a simple matter of looking up the street address of the calling telephone number. For instance, when an emergency services network (ESN) would receive a call setup message reflecting an incoming call, the ESN could read the calling number from the setup message and then dip into an Automatic Location Identification (ALI) database that correlates telephone numbers with street addresses, in order to determine the street address of the caller. The ESN could then deliver that address to an emergency services operator, to assist in handling the call.

With the advent of cellular telephony, this sort of simple database lookup became insufficient. Unlike landline telephones that were fixedly associated with particular street addresses, cellular telephones could place calls from anywhere within a cellular coverage area. Thus, a more complex system of position determination was required in order to determine the location of a calling cellular telephone.

To facilitate 911 services for cellular telephone callers, the United States Federal Communication Commission (FCC) mandated the implementation of "Enhanced 911" ("E911") services.

The E911 mandate was divided into two phases. According to Phase 1, the location had to be identified with an accuracy of at least cell and sector. As this information is typically maintained by a cellular wireless carrier in a subscriber's home location register ("HLR"), Phase 1 presented little technical challenge. According to Phase 2, the location must be provided with an accuracy of at least 100 meters (or 50 meters for handset-originated methods such as GPS), which is far more granular than the cell and sector information maintained in the HLR. In response, the Telecommunications Industry Association (TIA) has proposed a standard entitled "Enhanced Wireless 9-1-1 Phase 2" or "J-STD-036-A" (including a recent addendum, J-STD-036-A-1), the entirety of which is hereby incorporated by reference.

In order to achieve the accuracy specified by Phase 2, a cellular wireless carrier may employ a wireless position determining system that communicates with the cellular telephone in order to determine its current location. The positioning system could be "handset-based," in which case the cellular telephone would read its geographic coordinates from a satellite based positioning system (e.g., GPS) and report the coordinates over an air interface to the carrier. Alternatively, the positioning system could be "network-based," in which case the carrier might employ a technique such as triangulation (or, more specifically, "advanced forward link trilateration" (AFLT)) to measure the telephone's location. Alternatively, the position system could employ a combination of handset and network-based techniques.

In current practice, when a person places a 911 call from a cell phone, the wireless carrier can begin the wireless position determining process and send a key code (call identifier) to the ESN in a call setup message. Upon receipt of the call setup message, the ESN may then send ask the wireless carrier for the location that corresponds to the key code. In response, the carrier may then match the key code to the location that it determined by the wireless position determining process and may then report that location to the ESN.

An ESN distinguishes between landline and wireless (cellular) callers by the trunks on which the calls arrive at the ESN. In particular, the ESN would receive landline calls on trunks from landline switches (switches known to serve landline callers), and the ESN would receive wireless calls on trunks from wireless switches (switches known to serve wireless callers).

Thus, when the ESN receives a call setup message, it conventionally takes a location-determination action based on the trunk on which the call is being delivered. If the call is arriving on a trunk from a landline switch, the ESN dips into an ALI database to map the calling number to a street address. On the other hand, if the call is arriving on a trunk from a wireless switch, the ESN queries the wireless carrier for the caller's location.

SUMMARY

The present invention provides a mechanism for consolidating wireless and landline location determination, so as to provide a common source for location information. The invention is particularly useful in a scenario where a single trunk might carry both landline and wireless calls to an ESN, in which case the ESN could not determine from the trunk alone whether a given call is a landline call or a wireless call. However, the invention is applicable in other scenarios as well. Further, the invention can be applied to facilitate delivery of caller location to entities other than emergency service providers as well.

According to an exemplary embodiment of the invention, a telephone carrier will operate a "location interoperability platform," which will function to determine and report the location from which any call is placed, regardless of whether the call originates from a landline phone or a wireless phone.

In accordance with the exemplary embodiment, the location interoperability platform will be arranged to receive a signaling message that indicates a call request from an originating device, and the signaling message will carry data indicating whether the calling device is a landline device or a wireless device. Based on data in the signaling message, the platform will then select a location-determination process to apply in order to determine a location of the calling device. In particular, if the data indicates that the calling device is a landline device, then the platform will select a landline location-determination process, and if the data indicates that the calling device is a wireless device, then the platform will select a wireless location-determination process. The platform will then invoke the selected location-determination process and report the determined location to the called party, such as to an ESN for instance.

The landline location-determination process and wireless location-determination process are distinct from each other (although aspects of them may overlap). The landline location-determination process will typically involve performing a database lookup (e.g., an ALI dip) to map the calling telephone number directly to a street address where the number is based. And the wireless location-determination process will typically comprise (i) engaging in wireless communication with the originating device so as to determine geographic coordinates of the originating device itself or (ii) determining the location of cell sector in which the originating device is operating.

With the benefit of the exemplary embodiment, a telephone carrier can efficiently operate a single platform that determines and reports location for both wireless and landline calls. The ESN or other called party can thus easily consult the carrier's platform without the need to know whether the calling device is a wireless or landline device.

Aspects and advantages of the exemplary embodiment will be explained further in the following detailed description, which should be read in conjunction with the accompanying drawings.

DETAILED DESCRIPTION OF AN EXEMPLARY EMBODIMENT

1. Exemplary Architecture and Operation

Figure 1:
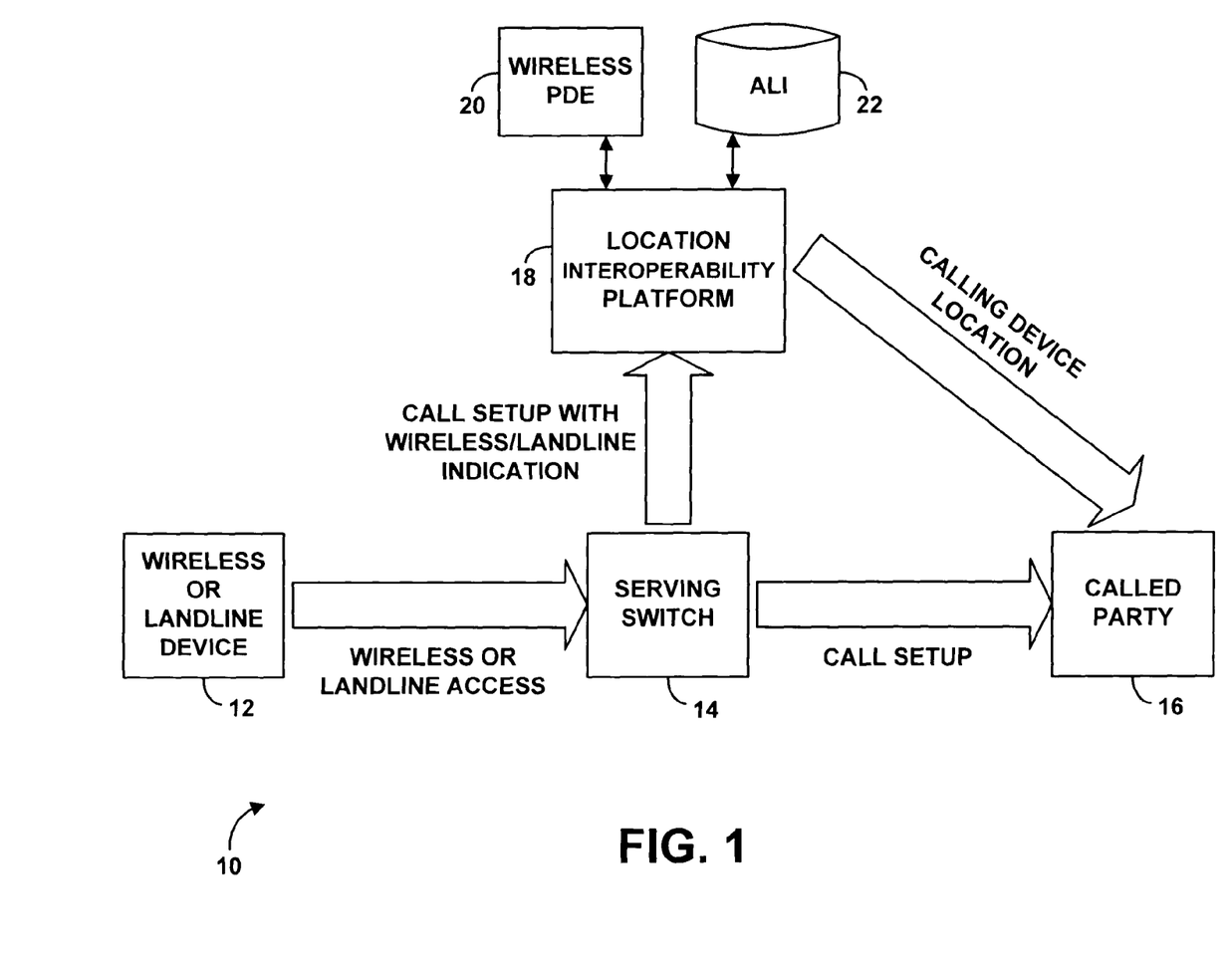
FIG. 1 is a simplified block diagram of a telecommunications network arranged to carry out the exemplary embodiment.
Figure 2:
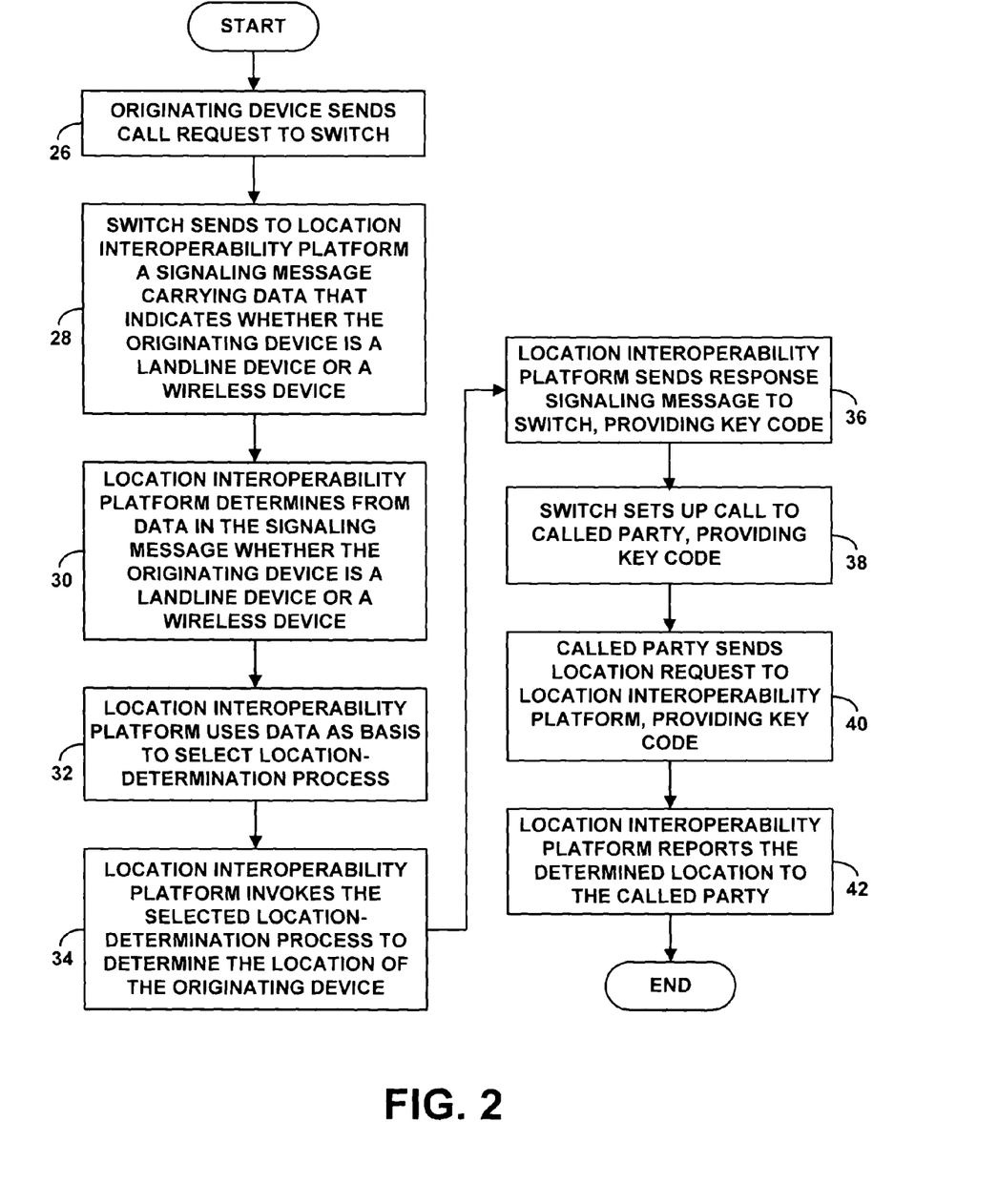
FIG. 2 is a flow chart depicting functions that can be carried out in the arrangement of FIG. 1 in accordance with the exemplary embodiment.

Referring to the drawings, FIG. 1 is a simplified block diagram of a telecommunications system 10 in which an exemplary embodiment of the present invention can be carried out. FIG. 2 is then a generalized flow chart depicting operation of the exemplary embodiment in the arrangement of FIG. 1.

It should be understood that the arrangements and processes described herein are set forth for purposes of example only, and other arrangements and elements (e.g., machines, interfaces, functions, orders of elements, etc.) can be used instead and some elements may be omitted altogether. Further, those skilled in the art will appreciate that many of the elements described herein are functional entities that may be implemented as discrete components or in conjunction with other components, in any suitable combination and location.

As illustrated in FIG. 1, system 10 includes a wireless or landline calling device (originating device) 12, a serving switch 14, a called party 16, a location interoperability platform 18, a wireless position determining entity (PDE) 20 and an ALI database 22. Each of these elements can take various forms, and the elements can be integrated, distributed or arranged in various ways.

Originating device 12, for instance, can be a wireless device such as a cellular telephone or other wirelessly connected telephone device. Alternatively, originating device 12 can be a landline device, such as conventional telephone, fax machine or computer, for instance. Originating device 12 can be a standalone terminal that serves a user, or it can be interconnected with one or more other devices (not shown) that serve one or more users. For instance, originating device 12 could be an in-building hub that interfaces between a landline telephone network in the building and a cellular carrier's network outside the building.

Serving switch 14, in turn, can be arranged to serve wireless and/or landline telephone devices. For instance, serving switch 14 can be a mobile switching center (MSC) that serves cellular telephones or a service switching point (SSP) that serves landline telephones. Alternatively, serving switch could serve both wireless and landline telephone devices, in which case it would likely be coupled with the wireless devices by one or more radio access networks and with the landline devices by landline links such as fiber, coaxial cable or copper wire.

Although FIG. 1 shows only one serving switch 14 and one originating device 12, it should be understood that system 10 could equally include multiple serving switches and multiple originating devices. In that case, each switch could serve one or more originating devices, and each switch could communicate with the location interoperability platform 18

Location interoperability platform 18 is preferably connected with serving switch 14 by a signaling network (not shown), which could be an out-of-band network such as a common channel interoffice signaling (CCIS) network comprising one or more signal transfer points (STPs) in a manner well known in the art. Alternatively, location interoperability platform could be connected with serving switch 14 in some other way.

In the exemplary embodiment, location interoperability platform 18 may comprise application logic programmed onto a service control point (SCP) (or "integrated service control point" (ISCP)) platform of the type manufactured by Telcordia Technologies for instance. Such SCP platforms are commonly used in the art as "mobile positioning centers" (MPCs) as defined generally by J-STD-036-A, to determine and report wireless device locations. The exemplary location interoperability platform 18 can be a specialized MPC, which functions to determine and report not only wireless device location but also landline device location.

Wireless PDE 20 and ALI database engine 22, each of which can be integrated with the location interoperability platform 18 or can be located external to the platform, are exemplary location-determining elements that location interoperability platform 18 can invoke in order to determine the location of originating device 12. More particularly, the platform 18 uses wireless PDE 20 to determine location if data in a signaling message indicates that the originating device is a wireless device, and the location interoperability platform 18 uses ALI database engine 22 to determine location if data in a signaling message indicates that the originating device is a landline device.

J-STD-036-A generally defines the concept of a "PDE" for determining wireless device location. According to the standard, the PDE can support one or more position determining technologies. Further, the MPC (or location interoperability platform, in this instance) can select a PDE to use based on the capabilities of the originating wireless device. In this regard, serving switch 14 can determine the capabilities of the originating device by referring to a stored device profile record, and switch 14 can send an indication of the device capabilities in the signaling message to the location interoperability platform. Alternatively, the location interoperability platform can itself look up the device characteristics in a profile store.

For example, if the originating wireless device includes a GPS receiver or can otherwise read its location from a satellite-based positioning system, the PDE may might determine the location of the device by asking the originating device for a read on its location. In that case, the PDE might communicate with the originating wireless device via SMS-based signaling (SMDPP messages) between the PDE and the serving switch 14 and via position determination messaging over an air interface between the switch 14 and the originating device 12. (SMS messaging and position determination messaging over the air interface are defined, respectively, by industry standards IS-637 and IS-801, which are well known to those skilled in the art.)

As another example, if the originating wireless device is incapable of determining its GPS location, the PDE might determine the location of the originating device by querying a cellular home location register (HLR) to determine the cell sector where the originating wireless device is currently registered. Alternatively, the PDE might invoke a process of triangulation, to determine the location of the originating device by comparing the time that it takes signals to pass to and from the originating device from various fixed-position antennas.

As yet another example, the PDE might apply a combination of triangulation and satellite-based location determination to determine the location of the originating wireless device. Still further, the PDE might use other wireless positioning techniques now know or later developed.

The ALI database engine, on the other hand, includes data that correlates telephone numbers with street addresses where those numbers are located. Thus, the location interoperability platform can simply query the ALI database to determine a street address keyed to the calling telephone number.

The called party 16 can also take various forms. For example, the called party can be an emergency services network, which functions to route emergency services calls to public safety answering points (PSAPs) in a manner well known in the art, as described in J-STD-036-A. As another example, the called party 16 could be another sort of location-based service provider, such as a voice command platform that conveys information to a caller based on the location of the caller. As still another example, the called party 16 could comprise any telephone device with which the originating device can communicate, regardless of whether the called party provides a location-based service.

In the exemplary embodiment, the called party may include equipment to set up calls coming from serving switch 14 as well as equipment to request and receive location information from location interoperability platform. For instance, if the called party is an emergency services network, according to J-STD-036-A, the ESN may include an Emergency Services Network Entity (ESNE) that routes and processes voice calls, like a conventional switching point, distributing calls to public safety answering points (PSAPs) where emergency service operators are based. Further, the ESN may include an Emergency Services Message Entity (ESME) that routes and processes out of band messages related to emergency services calls. A communication path such as a packet switched network or direct T1 line may then connect the ESME and the location interoperability platform, to facilitate communication of location information from the platform to the ESN.

Referring now to FIG. 2, at step 26, the exemplary process begins by the originating device 12 placing a call to the called party 16, such as by signaling the telephone number of called party 16 to serving switch 14. For example, if the originating device is an analog landline telephone, the originating device may go off hook and send the called party number as DTMF digits to the serving switch. As another example, if the originating device is a wireless device such as a cellular telephone, the originating device may send an origination message via an air interface access channel to the serving switch, carrying the called party number as a parameter in the message.

Upon receipt and processing of the origination message, at step 28, the serving switch encounters an intelligent network trigger or other call processing logic that causes the switch to generate and send a signaling message to location interoperability platform 18 (or to another entity, that would forward the message to the platform). For instance, the switch may trigger on the dialed digits (such as the digits "911," for instance).

Under well known industry standards such as IS-771, IS-41 and J-STD-036-A, the signaling message that a switch sends up to a service control point (SCP), MPC or other such platform in response to an intelligent network trigger can be an Origination_Request (ORREQ) message, which conventionally carries an indication of the calling party's phone number, among other information. According to the exemplary embodiment, serving switch 14 may thus send an ORREQ message to the location interoperability platform. Alternatively, the message that switch 14 sends could take other forms.

In the exemplary embodiment, the signaling message that the switch 14 sends to the location interoperability platform 18 will preferably include data that indicates whether the originating device 12 is a wireless device or a landline device. Thus, the switch will write that data into the signaling message.

The data indicating whether the originating device is a landline or wireless device can take various forms. For example, the data can simply be the telephone number of the originating device, provided that the telephone number can then be used to determine whether the originating device is wireless or landline. In that case, the location interoperability platform 18 could refer to a database that categorizes telephone numbers as landline or wireless, so as to determine, based on the telephone number of the originating device, whether the originating device is a landline device or a wireless device.

If the data is the telephone number of the originating device, then the serving switch does not need to know whether the originating device is landline or wireless, in order to be able to insert the data in the signaling message. The switch merely needs to have the telephone number of the originating device, as is conventional.

Alternatively, the data could take other forms. For instance, the data could be a digital code (as simple as a 0 or 1 bit, or a more complex bit pattern) in a predefined field of the ORREQ message, which the switch 14 and the location interoperability platform 18 understand to indicate whether the originating device is a landline device or a wireless device. In that case, the serving switch 14 would need to know whether the originating device is landline or wireless, in order to be able to insert the proper code into the ORREQ message.

In some cases, the serving switch might inherently know whether the originating device is landline or wireless. For instance, if the switch serves only landline devices, then the switch would know that the originating device is landline. By the same token, if the switch serves only wireless devices, then the switch would know that the originating device is wireless.

Alternatively, if the switch serves both landline and wireless devices, then the switch may know whether the originating device is landline or wireless based on the port on which the call request arrives at the switch. For instance, call requests from wireless devices might enter on a port from a cellular base station, whereas call requests from landline devices might enter on a port from a network interface unit that demarcates the border between the network and customer premises equipment.

Still alternatively, if the switch has access to a database that categorizes telephone numbers as landline device numbers and wireless device numbers, then the switch could refer to that database to determine based on the telephone number of the originating device whether the originating device is landline or wireless.

Yet alternatively, the originating device itself could provide the serving switch with an indication of whether the originating device is a landline or wireless device. For instance, the originating device could include in its call request to the serving switch some supplemental dialed digits or some other predefined code that indicates whether the originating device is landline or wireless. As will be described more below, this function can be particularly advantageous in a scenario where the originating device is a wireless hub that serves landline telephones.

The location interoperability platform then receives the signaling message. And at step 30, the location interoperability platform determines based on the data in the message whether the originating device is a landline device or a wireless device. In this regard, if the data is just the telephone number of the originating device, then the location interoperability platform can refer to a database that categorizes telephone numbers as landline or wireless telephone numbers, as noted above. Alternatively, if the data is some other sort of code, then the location interoperability platform can apply program logic to determine whether the code means the originating device is a landline device or the code means the originating device is a wireless device.

At step 32, the location interoperability platform then uses the data as a basis to select a location-determination process to apply. In this regard, according to the exemplary embodiment, if the data indicates that the originating device is a wireless device, then the location interoperability platform selects a wireless location-determination process. On the other hand, if the data indicates that the originating device is a landline device, then the location interoperability platform selects a landline location-determination process. And at step 34, the location interoperability platform invokes the selected location-determination process, so as to determine the location of the originating device.

In the exemplary embodiment, invoking a wireless location-determination process will involve invoking wireless PDE 20, which may then determine the location of the originating device in various ways. As noted above, for instance, the PDE could signal to the originating device via a communication path including a wireless air interface, to get a satellite-based read on the device's location. Alternatively, or additionally, the PDE could employ triangulation. Still alternatively or additionally, the PDE could consult an HLR or other entity to determine a location of the cell sector where the originating device is registered. Preferably, the PDE will return geographic coordinates of the originating device, i.e., coordinates that approximate the precise location of the device or of the sector in which it is operating. The location interoperability platform may then further translate those coordinates, such as by referring to a mapping database to convert those coordinates into a street address or other location indication.

On the other hand, invoking a landline location-determination process preferably involves simply performing a database lookup keyed to the telephone number of the originating device, to determine a street address corresponding to that number. In the exemplary embodiment, the location interoperability platform 18 will perform the database lookup in ALI database 22.

In accordance with the exemplary embodiment, the location interoperability platform assigns a key code (such as a randomly chosen number, or a code that comprises the telephone number of the originating device) to the call. And, at step 36, the location interoperability platform sends a response signaling message to the switch, providing the switch with the key code in an agreed field or form. In this regard, if the signaling message that the switch sent to the location interoperability platform was an ORREQ message, then the response signaling message can be an "orreq" response message.

In turn, at step 38, the switch 14 then sets up the call to the called party, by sending a call setup message to the called party. For instance, the switch 14 may send an ISDN User Part (ISUP) Initial Address Message (IAM) to a switch at the called party (or serving the called party). The message may carry the key code in a user-definable field. As a more specific example, if the called party is an ESN, an ESNE may receive the call setup message, and may work with the serving switch 14 to set up the call to an appropriate PSAP.

At step 40, after receipt of the call setup message, the called party then sends a location request to the location interoperability platform, requesting the location of the originating device. The location request carries the key code and passes over the communication path between the called party and the location interoperability platform. For instance, if the called party is an ESN, an ESME may send the location request to the location interoperability platform.

At step 42, the location interoperability platform then matches the key code in the location request with the key code that it assigned for the call, and the location interoperability platform reports the determined location of the originating device to in a response to the called party. As noted above, the determined location could be a street address or geographic coordinates, or it could take some other form.

Note that, as one of many possible variations on this process, the location interoperability platform 18 could instead push the determined location information to the called party 16. For instance, the location interoperability platform could return the location of the originating device to the switch 14 in the orreq response, and the switch could then send the location information in the ISUP IAM message to the called party. Alternatively, the location interoperability platform could autonomously send a signaling message to the called party, reporting the location.

2. Exemplary Component Architecture

Figure 3:
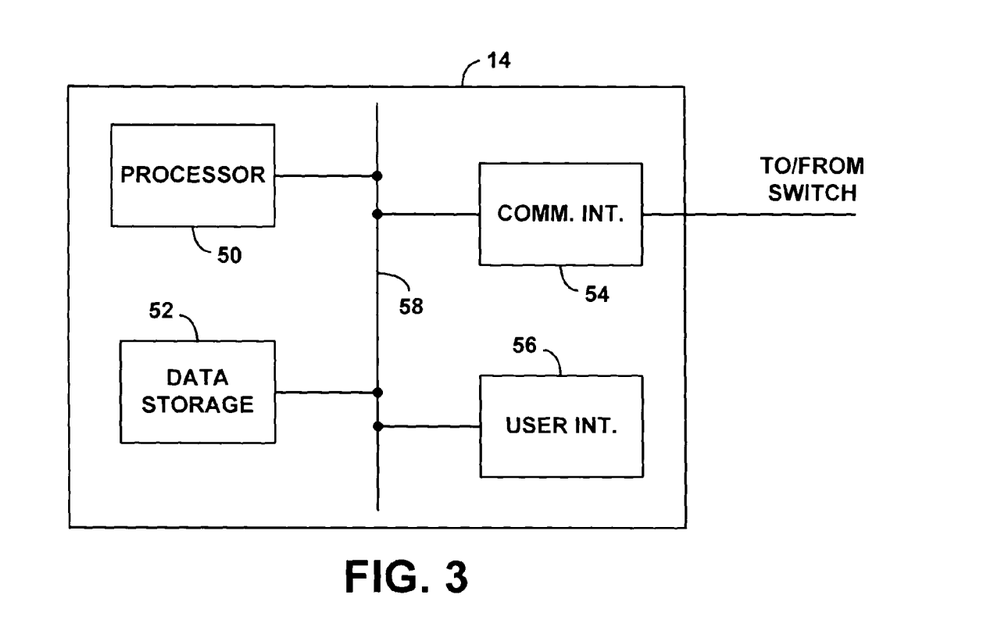
FIG. 3 is a functional block diagram of an exemplary originating device.
Figure 4:
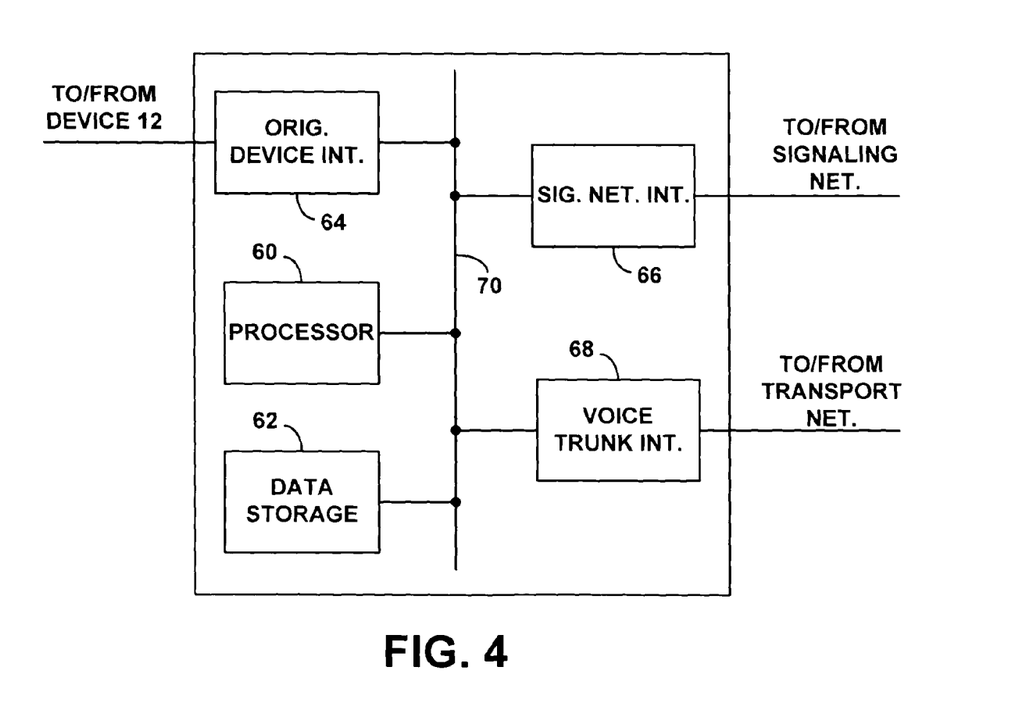
FIG. 4 is a functional block diagram of an exemplary serving switch.
Figure 5:
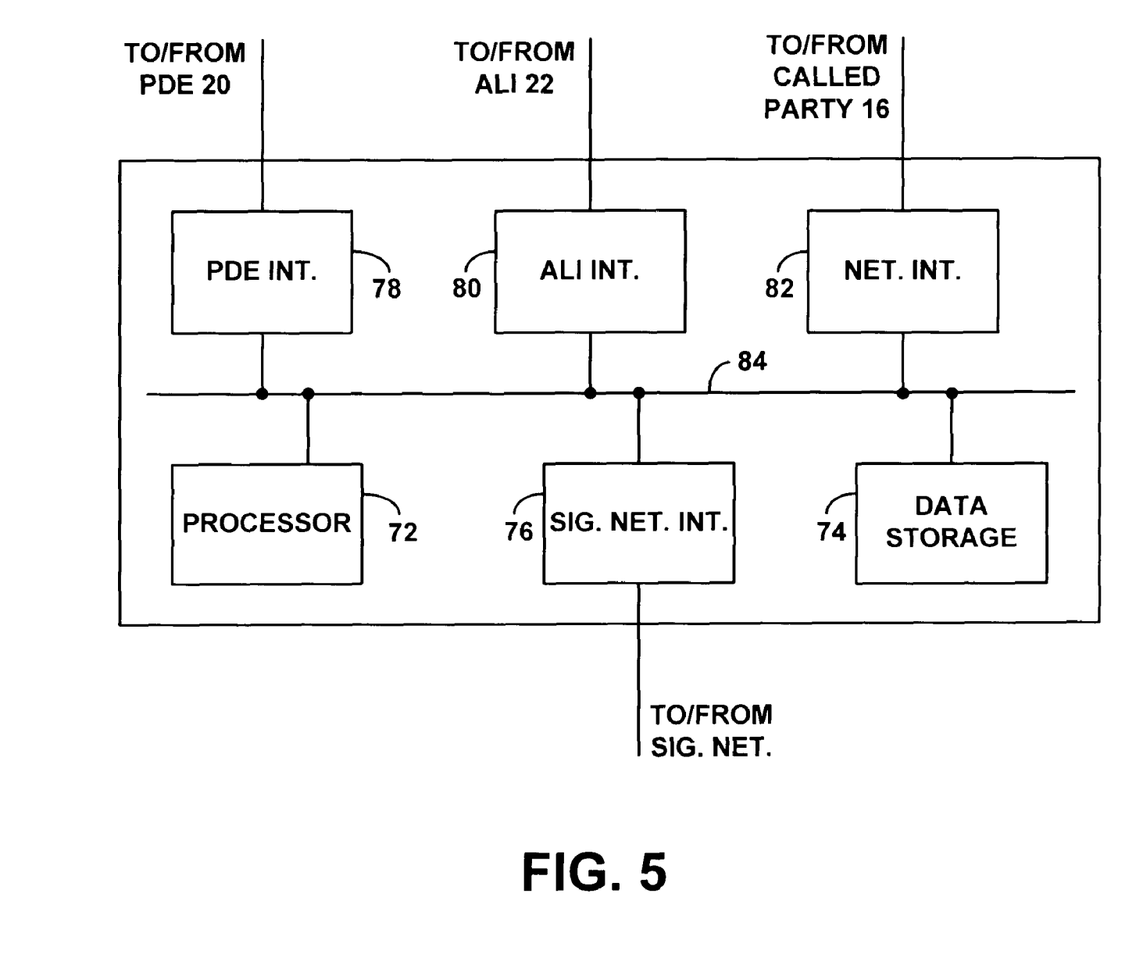
FIG. 5 is a functional block diagram of an exemplary location interoperability platform.

Referring next to FIGS. 3-5, simplified block diagrams are provided to help illustrate some of the functional components that would likely be included in an originating device 12, a switch 14 and a location interoperability platform 18 in accordance with the exemplary embodiment. The particular configuration of these entities could of course vary from that shown.

a. Exemplary Originating Device

FIG. 3 is a functional block diagram of an exemplary originating device 12. As shown, the originating device may include a processor 50, data storage 52, a communication interface 54, and a user interface 56, all of which may be coupled together by a system bus or other mechanism 58.

The communication interface 54 may function to connect the originating device with a communication network comprising switch 14, through any suitable access mechanism.

For example, of the originating device is a landline telephone, the communication interface might be a conventional telephone interface circuit (including a hybrid circuit and other typical components). As another example, if the originating device is a cellular telephone, the communication interface might be a wireless chipset of the type made by Qualcomm Inc., as well as an antenna, to facilitate communication over an air interface with a radio access network according to a protocol such as CDMA, TDMA or GSM for instance.

User interface 56 may enable a user to initiate a call to called party 16. For instance, user interface 56 may comprise a telephone keypad through which a user can dial the telephone number of the called party 16.

Processor 50 may be made up of one or more dedicated and/or general purposes processors. And data storage 52 could comprise volatile and/or non-volatile storage. Further, the data storage could be integrated in whole or in part with the processor.

In the exemplary embodiment, data storage 52 includes program instructions that are executable by processor 50 to carry out various functions described herein. For instance, the program instructions may be executable to send an origination message to switch 14 in order to originate a call to called party 16. Further, the program instructions may be executable to include in the origination message an indication of whether the originating device is a landline device or a wireless device.

b. Exemplary Switch

FIG. 4 is a functional block diagram of an exemplary switch 14. As shown, the switch 14 may include a processor 60, data storage 62, an originating device interface 64, a signaling network interface 66 and a voice trunk interface 68, all of which may be coupled together by a system bus, network, or other mechanism 70.

The originating device interface 64 may connect with an access channel to originating device 12, and the access channel and originating device interface 64 may vary depending on the form of originating device 12. For example, if originating device 12 is an analog landline telephone, the originating device interface 64 might be a card that connects with a network interface unit near the customer premises where the telephone is located. As another example, if the originating device is a cellular telephone, then the originating device interface 64 might be tied to a base station controller (BSC), which controls a base transceiver station (BTS) that radiates to define an air interface for communication with the originating device. Arrangements of such a radio access network are well known to those skilled in the art.

The signaling network interface 66 may then couple with a signaling network such as a CCIS network of the type described above, through conventional means, so as to facilitate signaling communication with location interoperability platform 18 and with called party 16. Further, the voice trunk interface 68 can connect with a voice trunk to the called party, over which switch 14 can communicate voice or other bearer data between the originating device and the called party.

The processor 60 can then be one or more processors, and data storage 62 can be volatile and/or nonvolatile storage, which can be integrated wholly or partly with the processor 60. The data storage 62 preferably holds program instructions that are executable by processor 60 to carry out various functions described herein. For example, the instructions may define call processing logic that causes the switch to generate and send to location interoperability platform a signaling message that reflects a call request from originating device 12 and that carries data indicating whether the originating device is a landline device or a wireless device. Further, the data storage may contain a database that categorizes telephone numbers as landline or wireless, for reference as described above.

c. Exemplary Location Interoperability Platform

FIG. 5 is next a functional block diagram of an exemplary location interoperability platform 18. As shown, the exemplary location interoperability platform may include a processor 72, data storage 74, a signaling network interface 76, a PDE interface 78, an ALI interface 80, and a location-request interface 82, all of which may be coupled together by a system bus, network or other mechanism 84.

Signaling network interface 76 connects with a signaling network so that location interoperability platform 18 can engage in signaling communication with switch 14, such as to receive ORREQ messages and to send orreq response messages. PDE interface 78 then connects with wireless PDE 20 and can take whatever form is required in order to couple with the PDE. (Alternatively, as noted above, the PDE could be integrated with the location interoperability platform, so this interface might be omitted.) Similarly, ALI interface 80 connects with an ALI database engine and can take whatever form is required in order to couple with the ALI database engine. (And similarly, as noted above, the ALI database could be integrated with the location interoperability platform, so this interface might be omitted.)

Location-request interface 82, in turn, functions to receive location requests from called party 16 and to report locations to the called party. The location-request interface could thus comprise a server that receives from the called party a packet-based request for the location of originating device 12 and that sends to the called party a packet-based indication of the determined location of the originating device.

Processor 72 can then be one or more processors, and data storage 74 can be volatile and/or nonvolatile storage, which can be integrated wholly or partly with the processor 72. The data storage 74 preferably holds program instructions that are executable by processor 72 to carry out various functions described herein.

For example, the program instructions preferably define logic for receiving from switch 14 a signaling message that includes data indicating whether the originating device is a landline device or a wireless device, and for using the data as a basis to select a location-determination process to apply in order to determine the location of the originating device. More particularly, as described above, the program instructions could be executable to select a wireless location-determination process if the data indicates that the originating device is a wireless device and to select a landline location-determination process if the data indicates that the originating device is a landline device. In turn, the program instructions may be executable to invoke the selected location-determination process so as to determine the location of the originating device.

Further, the data storage 74 may hold a database that categorizes telephone numbers as landline device numbers and wireless device numbers. As noted above, the program instructions may then be executable to refer to that database so as to determine based on a telephone number of the originating device whether the originating device is landline or wireless.

As another example, the program instructions may be executable to receive and respond to a location request from called party 16 by reporting a determined location of the originating device 12.

3. Variation

Designating Fixed Wireless Devices as Landline Devices

In most cases, the indication or determination of whether a given originating device is a landline device or a wireless device will be accurate and truthful. However, in some cases, it might make sense to characterize a wireless device as a landline device. For instance, if a wireless device is located in a fixed location, then it might make sense to characterize the wireless device as a landline device, for purposes of location determination.

As noted briefly above, an example of this scenario is when a hub interfaces between a landline telephone network in a building (or other area) on the one hand, and a carrier's wireless network on the other hand. Such a hub could be positioned in or on a building to provide wireless telephone service for landline telephones. In particular, the hub could emulate a landline telephone circuit (local loop) to support operation of landline telephones and could then include a wireless chipset to engage in cellular wireless communication via a carrier's radio access network. The hub could then connect outgoing calls from a landline telephone to the radio access network and incoming calls from the radio access network to a landline telephone.

Because the hub would be in a fixed location, even though it is a wireless device, the hub could be treated as a landline device for purposes of the present invention, and ALI database 22 could list the street address of the hub's telephone number.

Thus, for instance, when the hub sends an origination message to switch 14, the hub can include in the origination message an indication that that the hub is a landline device. When the switch 14 receives that indication, the switch could responsively include in its signaling message to location interoperability platform 18 an indication that the originating device is a landline device. The location interoperability platform would then responsively determine its street address by reference to the ALI database.

Alternatively, a database maintained or accessed by the switch 14 or location interoperability platform could categorize the telephone number of the hub as a landline device number. Thus, when the switch receives an origination request from the hub, the switch could refer to that database and could determine that the originating device is a landline device (even though it is actually a wireless device). Or when the location interoperability platform receives an ORREQ message carrying the telephone number of the hub as the calling number, the location interoperability platform could refer to the database and could determine based on that telephone number that the originating device is a landline device (again, even though it is actually a wireless device.)

Another example of this scenario could be when a fixed wireless pay phone or other fixed wireless terminal is used. Provided that the device is located sufficiently in a fixed position that it makes sense to list the street address of the device in the ALI database, it would then make sense to characterize the device as a landline device for purposes of the present invention.

4. Conclusion

An exemplary embodiment of the present invention has been described above. It should be understood, however, that changes to the exemplary embodiment are possible, consistent with the true spirit and scope of the invention as defined by the claims.

We claim:

1. A method comprising:
   receiving from an originating device, at a network switch, a request to establish a call to a called party;
   in response to receiving the request, (i) the network switch making a first determination of whether the originating device is a landline device or a wireless device, and (ii) the network switch generating a signaling message including data that specifies, based on the first determination, whether the originating device is a landline device or a wireless device;
   sending the signaling message from the network switch to a network platform;
   making a second determination at the network platform, based on the data, whether the originating device is a landline device or a wireless device;
   if the second determination is that the originating device is a landline device, then the network platform invoking a landline location-determination process to determine a location of the originating device; and
   if the second determination is that the originating device is a wireless device, then the network platform invoking a wireless location-determination process to determine a location of the originating device.

2. The method of claim 1, wherein:
   the wireless location-determination process involves engaging in wireless communication with the originating device to determine geographic coordinates of the originating device; and
   the landline location-determination process involves performing a database lookup keyed to a telephone number of the originating device, to determine a street address corresponding to the telephone number.

3. The method of claim 2, wherein the wireless location-determination process comprises a function selected from the group consisting of (i) satellite-based positioning, (ii) triangulation, (iii) a combination of satellite-based positioning and triangulation, and (iv) cell sector location determination.

4. The method of claim 1, wherein:
   the wireless location-determination process involves determining geographic coordinates of a cellular coverage area in which the originating device is operating; and
   the landline location-determination process involves performing a database lookup keyed to a telephone number of the originating device, to determine a street address corresponding to the telephone number.

5. The method of claim 1, wherein making the first determination of whether the originating device is a landline device or a wireless device comprises:
   making the first determination, based on the telephone number of the originating device.

6. The method of claim 5, wherein making the first determination, based on the telephone number of the originating device, whether the originating device is a landline device or a wireless device comprises:
   referring to a database that categorizes telephone numbers as landline device telephone numbers and wireless device telephone numbers.

7. The method of claim 1, wherein the request to establish the call to the called party is a call setup message, the call setup message including an indication of whether the originating device is a landline device or a wireless device, and wherein making the first determination of whether the originating device is a landline device or a wireless device comprises:

making the first determination based on the indication.

8. The method of claim 7, further comprising:

the originating device inserting the indication into the call setup message and sending the call setup message to the network switch.

9. The method of claim 1, further comprising:

sending to the network switch a response to the message, the response carrying a key code;

thereafter receiving a location request carrying the key code, and responsively reporting the location.

10. The method of claim 9, wherein:

receiving the location request comprises receiving the location request from the called party; and reporting the location comprises reporting the location to the called party.

11. The method of claim 10, wherein the called party is a location-based service provider.

12. The method of claim 10, wherein the called party is an emergency services system.

13. The method of claim 9, wherein the key code comprises the telephone number of the originating device.

14. The method of claim 1, wherein the originating device is a wireless device, but the data indicates that the originating device is a landline device.

15. A location interoperability system comprising:

a network switch adapted to receive a message indicating a request by an originating device to establish a call to a called party;

program logic, in the network switch, executable (i) to make a first determination of whether the originating device is a landline device or a wireless device, and (ii) to generate a signaling message including data that specifies, based on the first determination, whether the originating device is a landline device or a wireless device;

a network platform adapted to receive the signaling message including the data that specifies whether the originating device is a wireless device or a landline device; and program logic, in the network platform, executable (i) to make a second determination, based on the data, whether the originating device is a landline device or a wireless device, (ii) if the determination is that the originating device is a landline device, then to invoke a landline location-determination process-to determine a location of the originating device, and (iii) if the determination is that the originating device is a wireless device, then to invoke a wireless location-determination process to determine a location of the originating device.

16. The location interoperability system of claim 15, wherein:

the wireless location-determination process involves engaging in wireless communication with the originating device to determine geographic coordinates of the originating device; and the landline location-determination process involves performing a database lookup keyed to a telephone number of the originating device, to determine a street address corresponding to the telephone number.

17. The location interoperability system of claim 16, wherein the wireless location-determination process comprises a function selected from the group consisting of (i) satellite-based positioning, (ii) triangulation, (iii) a combination of satellite-based positioning and triangulation, and (iv) cell sector location determination.

18. The location interoperability system of claim 15, wherein the program logic, in the network switch, executable to make the first determination of whether the originating device is a landline device or a wireless device comprises:

program logic, in the network switch, executable to make the first determination based on the telephone number of the originating device.

19. The location interoperability system of claim 18, further comprising a database that categorizes telephone numbers as landline device telephone numbers and wireless device telephone numbers, wherein the program logic, in the network switch, is further executable to refer to the database in order to make the determination based on the telephone number of the originating device whether the originating device is a landline device or a wireless device.

20. The location interoperability system of claim 15, wherein the wireless location-determination process involves determining geographic coordinates of a cellular coverage area in which the originating device is operating; and the landline location-determination process involves performing a database lookup keyed to a telephone number of the originating device, to determine a street address corresponding to the telephone number.

21. The location interoperability system of claim 15, wherein the program logic in the network platform is further executable (i) to send to the network switch a response to the signaling message, the response carrying a key code, and (ii) to thereafter receive a location request carrying the key code, and to responsively report the location.

22. The location interoperability system of claim 21, wherein the program logic in the network platform receives the location request from the called party and reports the location to the called party.

23. The location interoperability system of claim 22, wherein the called party is a location-based service provider.

24. The location interoperability system of claim 22, wherein the called party is an emergency services system.

25. The location interoperability system of claim 21, wherein the key code comprises the telephone number of the originating device.

* * * * *